US012270935B2

(12) United States Patent
Tapia

(10) Patent No.: US 12,270,935 B2
(45) Date of Patent: Apr. 8, 2025

(54) MULTI-SENSOR RADAR MICRODOPPLER HOLOGRAPHY

(71) Applicant: GM CRUISE HOLDINGS LLC, San Francisco, CA (US)

(72) Inventor: Daniel Flores Tapia, Fairfield, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 376 days.

(21) Appl. No.: 17/713,853

(22) Filed: Apr. 5, 2022

(65) Prior Publication Data

US 2023/0314559 A1 Oct. 5, 2023

(51) Int. Cl.
*G01S 7/295* (2006.01)
*G01S 7/40* (2006.01)
*G01S 13/50* (2006.01)
*G01S 13/931* (2020.01)

(52) U.S. Cl.
CPC .............. *G01S 7/295* (2013.01); *G01S 7/40* (2013.01); *G01S 13/50* (2013.01); *G01S 13/931* (2013.01)

(58) Field of Classification Search
CPC . G01S 7/295; G01S 7/40; G01S 13/50; G01S 13/931; G01S 7/2955; G01S 13/4454; G01S 13/589; G01S 13/87; G01S 13/89; G01S 7/356; G01S 7/415
See application file for complete search history.

(56) References Cited

U.S. PATENT DOCUMENTS

| 6,377,206 B1 * | 4/2002 | Petty ........................ G06T 5/73 |
| | | 342/159 |
| 2019/0302252 A1* | 10/2019 | Santra ..................... G01F 1/663 |
| 2023/0314588 A1* | 10/2023 | Hoffmann ............... G01S 7/356 |
| | | 342/59 |

FOREIGN PATENT DOCUMENTS

EP        3144702 A1 *   3/2017   ............. G01S 13/34

OTHER PUBLICATIONS

Chen et al., "Micro-Doppler Effect in Radar: Phenomenon, Model, and Simulation Study", IEEE Transactions on Aerospace and Electronic Systems, vol. 42, No. Jan. 1, 2006, 20 pages.
Mostajabi et al., "High Resolution Radar Dataset for Semi-Supervised Learning of Dynamic Objects", 8 pages.
(Continued)

*Primary Examiner* — Olumide Ajibade Akonai
*Assistant Examiner* — Yonghong Li

(57) ABSTRACT

Multi-sensor radar microDoppler holography is described. An example of a method includes performing a 2D Fourier transform calculation for multiple sets of raw Radar sensor data to generate Doppler spatial frequency map data, the raw sensor data including at least a first set of raw sensor data associated with a first Radar sensor at a first location and a second set of raw sensor data associated with a second Radar sensor at a second, different location; performing a DWT calculation of the Doppler spatial frequency map data; applying phase compensation to generate phase compensated data transforms; adding the phase compensated data transforms to generate a sum; performing an inverse 2D Fourier transform calculation to generate a transform result; and extracting microDoppler information and Doppler information extraction from the transform result.

7 Claims, 9 Drawing Sheets

(56) References Cited

OTHER PUBLICATIONS

Thayaparan et al., "Micro-Doppler Radar Signatures for Intelligent Target Recognition", Defence Research and Development Canada, Sep. 2004, 78 pages.
"Frequency Modulated Continuous Wave Technology", White Paper, Emerson, Jul. 2017, 9 pages.
Hanif et al., "Micro-Doppler Based Target Recognition with Radars: A Review", IEEE Sensors Journal, vol. 22, No. 4, Feb. 15, 2022, pp. 2948-2961.

* cited by examiner

MULTI-SENSOR RADAR MICRODOPPLER HOLOGRAPHY

FIELD

This disclosure relates generally to the field of data processing and, more particularly, to multi-sensor radar microDoppler holography.

BACKGROUND

Autonomous vehicles, also known as self-driving cars, driverless vehicles, and robotic vehicles, may be vehicles that use multiple sensors to sense the environment and move without human input. Automation technology in the autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) for facilitating driving safety. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1A:
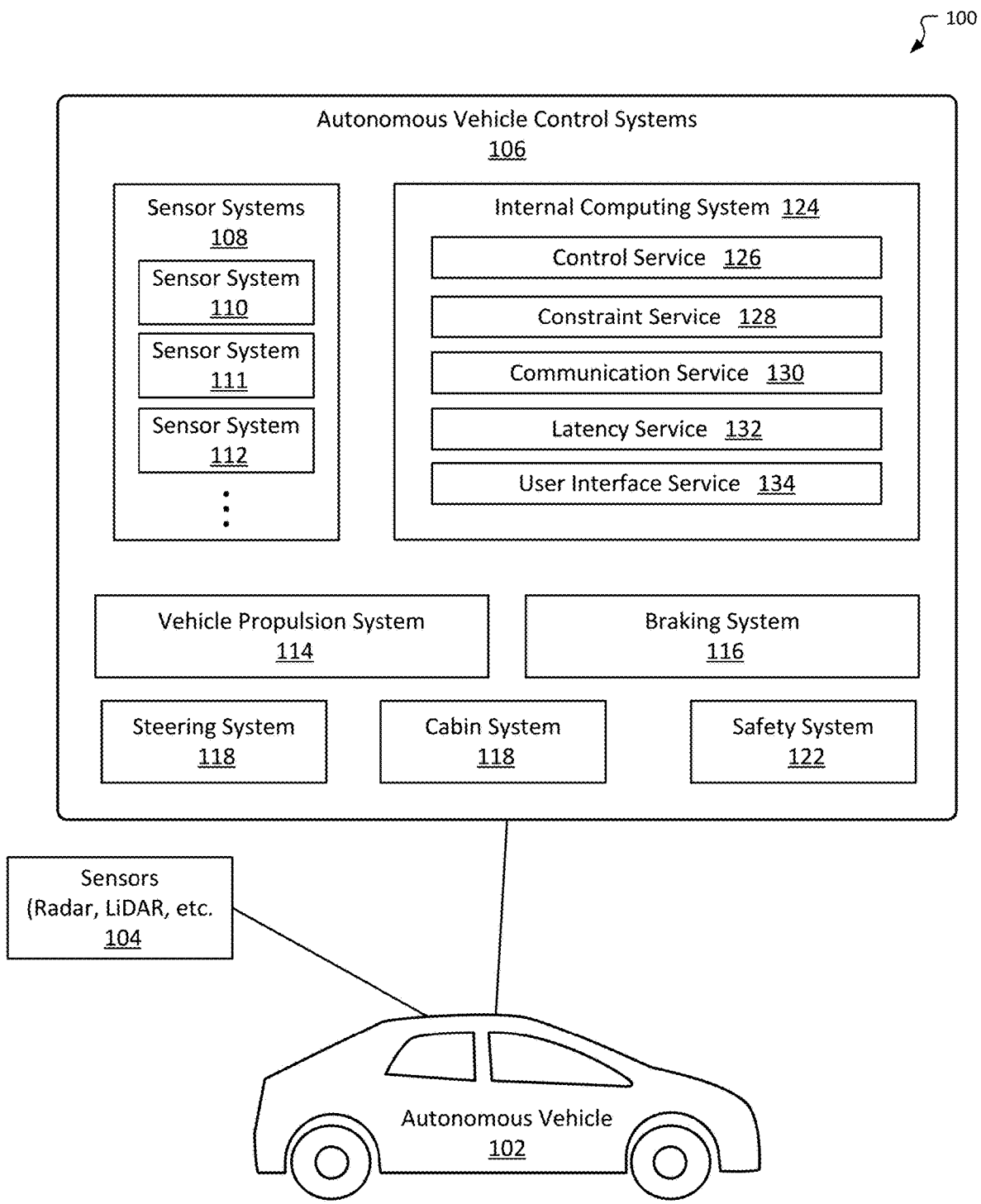
FIGS. 1A-1C are block diagrams to illustrate example autonomous vehicles.

Embodiments described herein are directed to multi-sensor radar microDoppler holography.

In autonomous vehicle operation and other mobile implementations, distance measurements may be received from multiple distance measurement sensors, wherein the distance sensors may include Radar (Radio Detection and Ranging) and LiDAR (Light Detection and Ranging), among others. Three-dimensional (3D) point clouds may be generated based on the distance measurements. In some cases, 3D point clouds corresponding to distance measurements from different distance measurement sensors may be combined into one 3D point cloud. A model may be generated based on the 3D point cloud. An object may be detected within the model, and in some cases may be classified by object type. For example, an autonomous vehicle may then navigate its driving by establishing a route that avoids or otherwise takes into consideration the detected object.

In sensing operations for vehicle operations, Frequency Modulated Continuous Waveforms (FMCW) provide high performance processing for automotive radar sensors, and increasingly are also used in automotive LiDAR sensors. FMCW radar is a type of radar sensor radiates continuous transmission power, as with Continuous Wave Radar (CW Radar). However, in contrast to this CW radar, FMCW radar can change its operating frequency during the measurement, i.e., the transmission signal is modulated in frequency.

Due to their highly adjustable nature, FMCW sensors are able to provide an excellent amount of information regarding targets in a scene, both in terms of location and velocity. In addition, FMCW sensors may be used to extract microDoppler information about a target. When a radar transmits a signal to a target, the signal interacts with the target, and returns (is reflected back) to the radar. When the target moves with a constant velocity, the carrier frequency of the returned signal will be shifted, which is referred to as the Doppler effect. The Doppler frequency shift is determined by the wavelength of the electromagnetic wave and the relative velocity between the radar and the target.

However, if the target in question includes vibration or rotation in addition to motion, this can induce a frequency modulation on the returned signal, which is referred to as the micro-Doppler effect. The micro-Doppler effect is a signal feature that can provide additional information about target rotational and vibrational motion. For example, the micro-Doppler effect can be applied to help distinguish a living organism (for example, as a dog or other animal) from an inanimate object (such as fire hydrant) that is of similar size, to distinguish between objects in operational and non-operational states, or to otherwise add to ranging information.

MicroDoppler signatures generated using current processing chains includes certain shortcomings. These microDoppler signatures are limited to motion information in a radial direction, and thus providing only limited information if the vibrational or rotational motion of the target is not within this direction. Further, the microDoppler signatures are conventionally limited to using co-located receiver locations, which results in non-optimal information use in platforms having more than one radar sensor. However, fusing microDoppler signatures from two or more different aspect angles from a target is not a trivial process as the alignment of the signal phases and proper combination can be extremely computationally expensive.

In some embodiments, a system or apparatus provides for multi-sensor Radar microDoppler holography, wherein Radar microDoppler holography refers to three-dimensional (3D) Radar imaging including microDoppler information. A system or apparatus includes a processing chain that takes advantage of rotational and vibrational motion vectors by using microDoppler signatures from different sensors at different locations. The system or apparatus applies a custom holographic approach to coherently combine the phase information from different radar sensors to generate micro-Doppler motion vectors of the different point cloud vectors.

Figure 1B:
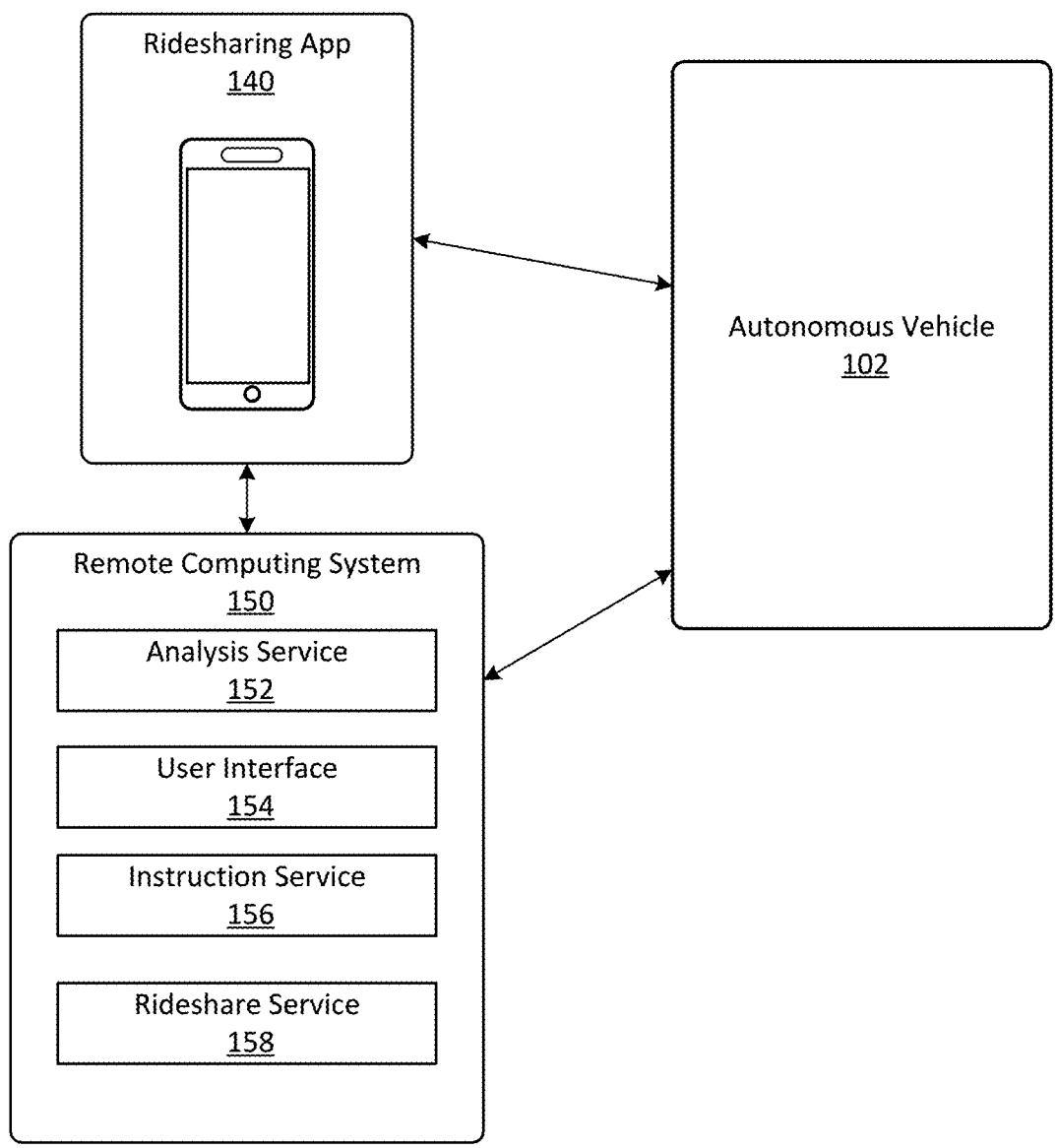
Figure 1C:
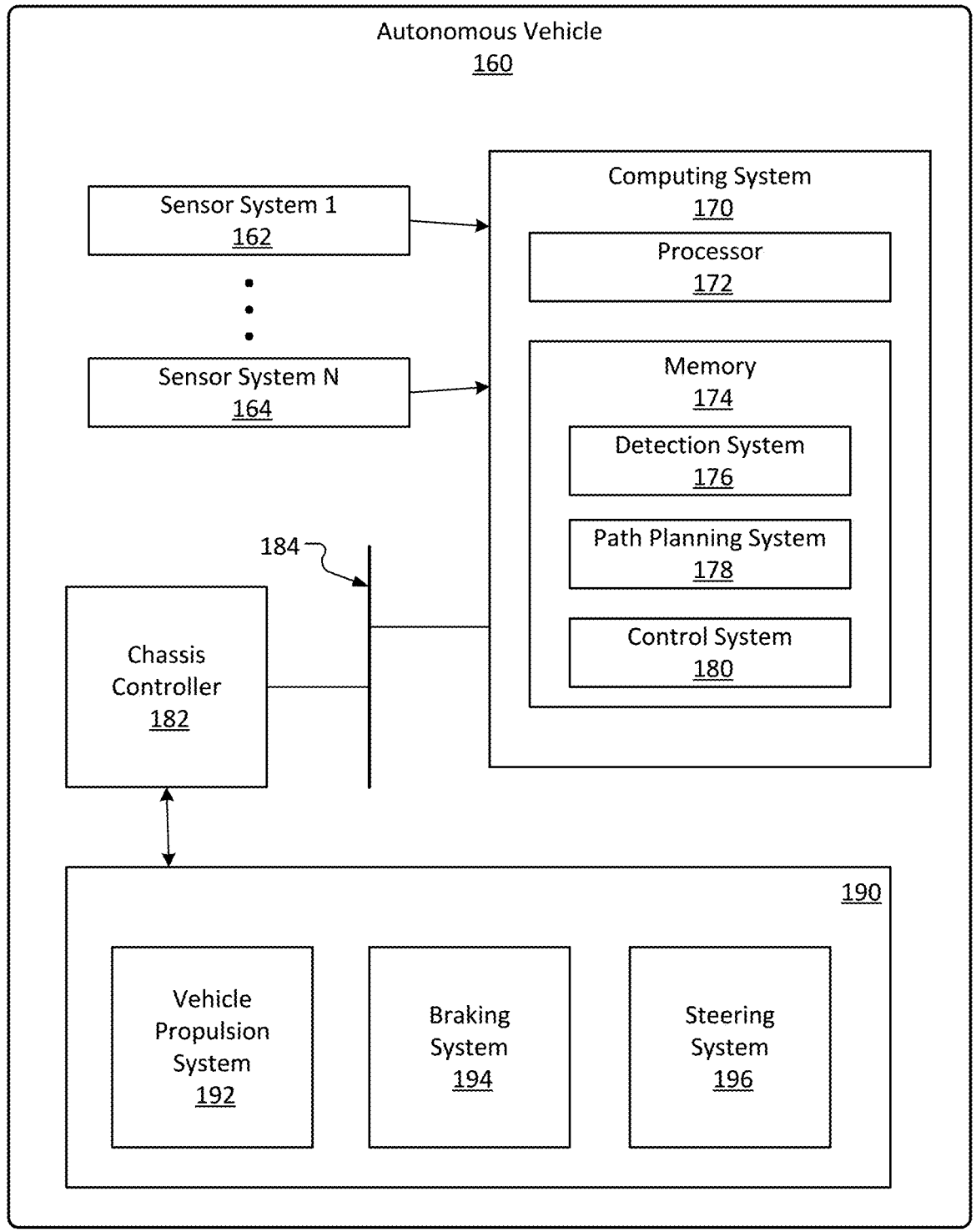

FIGS. 1A-1C are block diagrams to illustrate example autonomous vehicles. In FIG. 1A, autonomous vehicle 102 has the functionality to navigate roads without a human driver by utilizing sensors 104 and autonomous vehicle control systems 106.

Autonomous vehicle 102 can include, for example, sensor systems 108 including any number of sensor systems (e.g., sensor system 110, sensor system 112). Sensor systems 108 can include various types of sensors that can be arranged throughout autonomous vehicle 102. For example, sensor system 110 can be a camera sensor system. As another example, sensor system 111 can be a light detection and ranging (LIDAR) sensor system. As another example, sensor systems 112 can be a radio detection and ranging (Radar) sensor system, As a further examples, the sensor systems 108 may include an electromagnetic detection and ranging (EmDAR) sensor system, a sound navigation and ranging (SONAR) sensor system, a sound detection and ranging (SODAR) sensor system, a global navigation satellite system (GNSS) receiver system, a global positioning system (GPS) receiver system, accelerometers, gyroscopes, inertial measurement unit (IMU) systems, infrared sensor systems, laser rangefinder systems, microphones, etc.

Autonomous vehicle 102 can further include mechanical systems to control and manage motion of the autonomous vehicle 102. For example, the mechanical systems can include a vehicle propulsion system 114, a braking system 116, a steering system 118, a cabin system 120 and a safety system 122. Vehicle propulsion system 114 can include, for example, an electric motor, an internal combustion engine, or both. Braking system 116 can include an engine brake, brake pads, actuators, and/or other components to control deceleration of autonomous vehicle 102. Steering system 118 can include components that control the direction of autonomous vehicle 102. Cabin system 120 can include, for example, a cabin temperature control systems, an in-cabin infotainment systems, and other internal elements.

Safety system 122 can include various lights, signal indicators, airbags, systems that detect and react to other vehicles. Safety system 122 can include one or more Radar systems. Autonomous vehicle 102 can utilize different types of Radar systems, for example, long-range Radar (LRR), mid-range Radar (MRR) and/or short-range Radar (SRR). LRR systems can be used, for example, to detect objects that are farther away (e.g., 200 meters, 300 meters) from the vehicle transmitting the signal. LRR systems can operate in the 77 GHz band (e.g., 76-81 GHz). SRR systems can be used, for example, for blind spot detection or collision avoidance. SRR systems can operate in the 24 GHz band. MRR systems can operate in either the 24 GHz band or the 77 GHz band. Other frequency bands can also be supported.

Autonomous vehicle 102 can further include an internal computing system 124 that can interact with sensor systems 108 as well as the mechanical systems (e.g., vehicle propulsion system 114, braking system 116, steering system 118, cabin system 120 and safety system 122). Internal computing system 124 includes at least one processor and at least one memory system that can store executable instructions to be executed by the processor. Internal computing system 124 can include any number of computing subsystems that can function to control autonomous vehicle 102. Internal computing system 124 can receive inputs from passengers and/or human drivers within autonomous vehicle 102.

Internal computing system 124 can include control service 126, which functions to control operation of autonomous vehicle 102 via, for example, the mechanical systems as well as interacting with sensor systems 108. Control service 126 can interact with other systems (e.g., constraint service 128, communication service 130, latency service 132, and internal computing system 124) to control operation of autonomous vehicle 102.

Internal computing system 124 can also include constraint service 128, which functions to control operation of autonomous vehicle 102 through application of rule-based restrictions or other constraints on operation of autonomous vehicle 102. Constraint service 128 can interact with other systems (e.g., control service 126, communication service 130, latency service 132, user interface service 134) to control operation of autonomous vehicle 102.

Internal computing system 124 can further include communication service 130, which functions to control transmission of signals from, and receipt of signals by, autonomous vehicle 102. Communication service 130 can interact with safety system 122 to provide the waveform sensing, amplification, and repeating functionality described herein. Communication service 130 can interact with other systems (e.g., control service 126, constraint service 128, latency service 132 and user interface service 134) to control operation of autonomous vehicle 102.

Internal computing system 124 can also include latency service 132, which functions to provide and/or utilize timestamp information on communications to help manage and coordinate time-sensitive operations within internal computing system 124 and autonomous vehicle 102. Thus, latency service 132 can interact with other systems (e.g., control service 126, constraint service 128, communication service 130, user interface service 134) to control operation of autonomous vehicle 102.

Internal computing system 124 can further include user interface service 134, which functions to provide information to, and receive inputs from, human passengers within autonomous vehicle 102. This can include, for example, receiving a desired destination for one or more passengers and providing status and timing information with respect to arrival at the desired destination. User interface service 134 can interact with other systems (e.g., control service 126, constraint service 128, communication service 130, latency service 132) to control operation of autonomous vehicle 102.

Internal computing system 124 can function to send and receive signals from autonomous vehicle 102 regarding reporting data for training and evaluating machine learning algorithms, requesting assistance from a remote computing system 150 in FIG. 1B or a human operator, software updates, rideshare information (e.g., pickup and/or dropoff requests and/or locations), etc.

The remote computing system 150, as illustrated in FIG. 1B, is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102 such as performing object detection for methods and systems disclosed herein. The analysis service 152 can also perform analysis pertaining to data associated with one or more errors or constraints reported by autonomous vehicle 102. In another example, the analysis service 152 is located within the internal computing system 124.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 140 operating on (potential) passenger computing devices. The rideshare service 158 can receive requests to be picked up or dropped off from passenger ridesharing app 140 and can dispatch autonomous vehicle 102 for the trip. The rideshare service 158 can also act as an intermediary between the ridesharing app 140 and the autonomous vehicle wherein a passenger might provide instructions to the autonomous vehicle to 102 go around an obstacle, change routes, honk the horn, etc.

FIG. 1C illustrates an example autonomous vehicle 160 in accordance with one embodiment. In one embodiment, autonomous vehicle 160 is the same as autonomous vehicle 102 described with respect to FIGS. 1A and 1B. The autonomous vehicle 160 can navigate about roadways without a human driver based upon sensor signals output by sensor systems 162-164 of the autonomous vehicle 160. The autonomous vehicle 160 includes a plurality of sensor systems 162-164 (a first sensor system 162 through an Nth sensor system 164). The sensor systems 162-164 are of different types and are arranged about the autonomous vehicle 160. For example, the first sensor system 162 may be a camera sensor system and the Nth sensor system 164 may be a lidar sensor system. Other example sensor systems include, but are not limited to, radar sensor systems, global positioning system (GPS) sensor systems, inertial measurement units (IMU), infrared sensor systems, laser sensor systems, sonar sensor systems, and the like. Furthermore, some or all of the of sensor systems 162-164 may be articulating sensors that can be oriented/rotated such that a field of view of the articulating sensors is directed towards different regions surrounding the autonomous vehicle 160.

The autonomous vehicle 160 further includes several mechanical systems that can be used to effectuate appropriate motion of the autonomous vehicle 160. For instance, the mechanical systems 190 can include but are not limited to, a vehicle propulsion system 192, a braking system 194, and a steering system 196. The vehicle propulsion system 192 may include an electric motor, an internal combustion engine, or both. The braking system 194 can include an engine break, brake pads, actuators, and/or any other suitable componentry that is configured to assist in decelerating the autonomous vehicle 160. The steering system 196 includes suitable componentry that is configured to control the direction of movement of the autonomous vehicle 160 during propulsion.

The autonomous vehicle 160 additionally includes a chassis controller 182 that is activated to manipulate the mechanical systems 190 when an activation threshold of the chassis controller 182 is reached.

The autonomous vehicle 160 further comprises a computing system 170 that is in communication with the sensor systems 162-164, the mechanical systems 190, and the chassis controller 182. While the chassis controller 182 is activated independently from operations of the computing system 170, the chassis controller 182 may be configured to communicate with the computing system 170, for example, via a controller area network (CAN) bus 184. The computing system 170 includes a processor 172 and memory 174 that stores instructions which are executed by the processor 172 to cause the processor 172 to perform acts in accordance with the instructions.

The memory 174 comprises a detection system 176, a path planning system 178, and a control system 180. The detection system 176 identifies objects in the vicinity (e.g., scene context) of the autonomous vehicle 160. The detection system 176 may analyze sensor signals generated by the sensor system 162-164 to identify the objects. Detection system 176 may also identify characteristics of the detected objects, such as distance, velocity, direction, and so on. In some embodiments, the detection system 176 implements one or more trained machine learning (ML) models for the object identification.

The path planning system 178 generates a path plan for the autonomous vehicle 160, wherein the path plan can be identified both spatially and temporally according to one or more impending timesteps. The path plan can include one or more maneuvers to be performed by the autonomous vehicle 160. In one embodiment, the path planning system 178 can respond to detected EMVs in accordance with the techniques discussed herein.

The control system 180 is configured to control the mechanical systems of the autonomous vehicle 160 (e.g., the vehicle propulsion system 192, the braking system 194, and the steering system 196 based upon an output from the sensor systems 162-164 and/or the path planning system 178. For instance, the mechanical systems can be controlled by the control system 180 to execute the path plan determined by the path planning system 178. Additionally or alternatively, the control system 180 may control the mechanical systems 192-196 to navigate the autonomous vehicle 160 in accordance with outputs received from the sensor systems 162-164.

In some examples described herein autonomous vehicle 102 or 160 (or another device) may be described as collecting data corresponding to surrounding vehicles. This data may be collected without associated identifiable information from these surrounding vehicles (e.g., without license plate numbers, make, model, and the color of the surrounding vehicles). Accordingly, the techniques mentioned here can because for the beneficial purposes described, but without the need to store potentially sensitive information of the surrounding vehicles.

In some examples described herein autonomous vehicle 102 or 160 (or another device) may be described as collecting data corresponding to surrounding vehicles. This data may be collected without associated identifiable information from these surrounding vehicles (e.g., without license plate numbers, make, model, and the color of the surrounding vehicles). Accordingly, the techniques mentioned here can because for the beneficial purposes described, but without the need to store potentially sensitive information of the surrounding vehicles.

In some examples, the autonomous vehicle includes radar microDoppler holography operation to combine data received at multiple sensors that are located in different locations, thereby enabling the use of additional microDoppler information collected at varying angles from a target.

Figure 2:
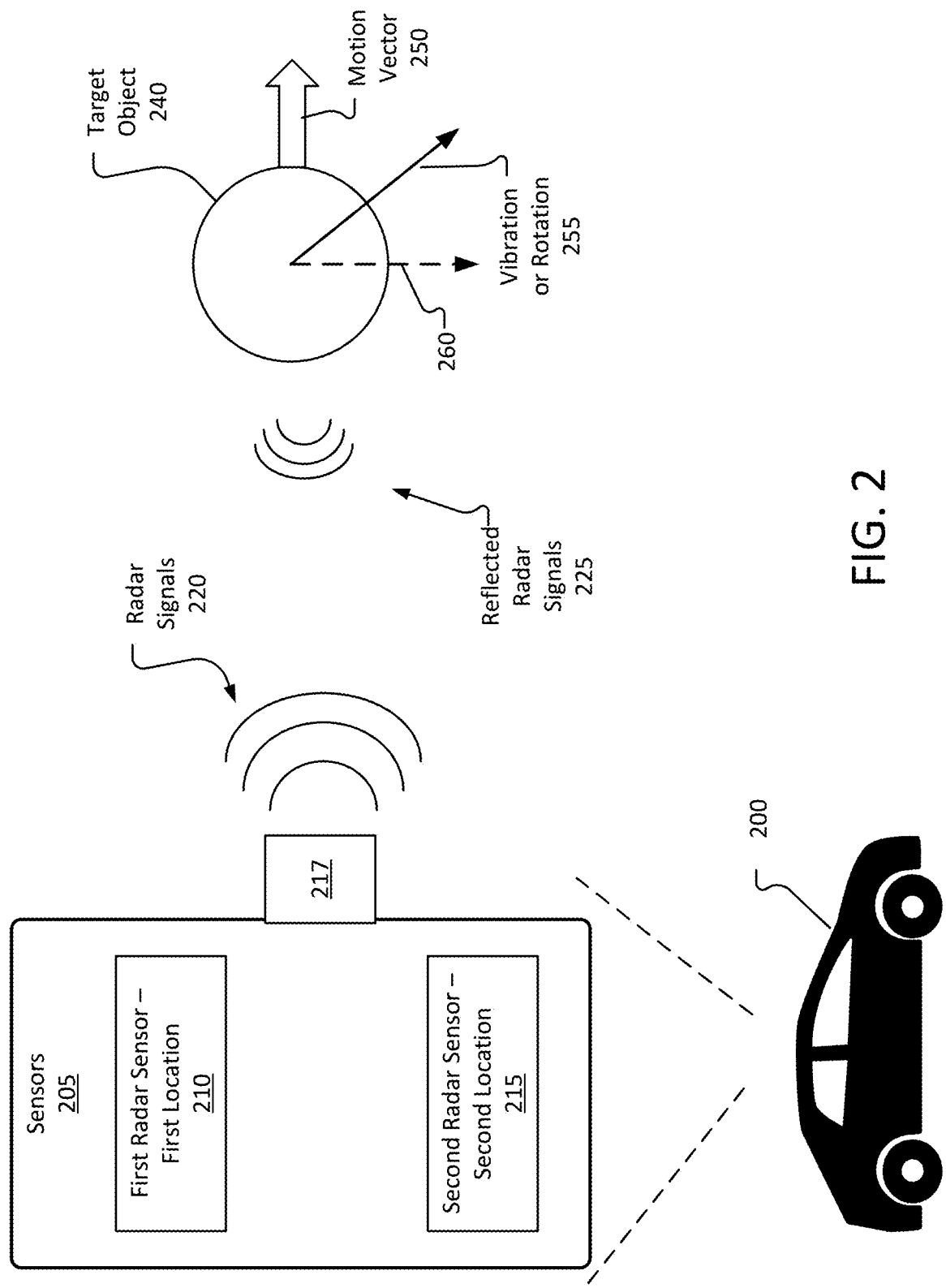
FIG. 2 illustrates Radar sensor operation for microDoppler detection, according to some embodiments.

FIG. 2 illustrates Radar sensor operation for microDoppler detection, according to some embodiments. Sensors 205 within an autonomous vehicle 200 includes multiple radar sensors, including at least a first radar sensor at a first location 210 and a second radar sensor at a second, different location 215, wherein the first and second Radar sensors 210-215 have overlapping fields of view. The autonomous vehicle further includes one or more Radar transmitters 217 to generate and transmit Radar signals 220. The sensors 205 may be utilized to detect and identify objects, including target object 240.

In operation, the autonomous vehicle generates and transmits the Radar signals 220 comprising radio signals in one or more established frequency ranges for Radar. The Radar sensors 210-215 each detect reflected radar signals 225 from objects that are within range, which may include the illustrated target object 240, which may include any person, animal, or inanimate object. Certain objects may be in motion, illustrated as the motion vector 250 in a certain direction for the target object 240, resulting in a Doppler shift in the reflected Radar signals 225. Further, the target object 240 may include a vibration or rotation component 255, resulting in a micro-Doppler effect that may be applied in identifying the target object 240. However, a vibration or rotation component 255 may in a direction other than a radial direction 260.

In some embodiments, the autonomous vehicle 200 includes a processing unit that provides multi-sensor Radar microDoppler holography to enable detection of microDoppler effects that are not limited to a radial direction from a Radar sensor. A system includes applies microDoppler signatures from different sensors at different locations, and provides for coherently combining the phase information from the different radar sensors to generate microDoppler motion vectors of the different point cloud vectors.

In some examples, during sensor calibration, the orientation and location of the different radar sensors 210-215 with overlapping field of views are recorded in the main Radar processing unit. A phase conversion map is derived based on the relative locations of the sensors with the vehicle platform datum. This map is derived via a mathematical model based on Erdely's principle.

In some embodiments, a system provides for comprehensive motion data reporting. Because information from overlapping Radar sensors is used to perform the point cloud generation, the information from the available target views is used, and it is not restricted to the radial direction only. This results in a higher sensitivity to motion patterns and an information rich point cloud.

Further, a system can enable low latency in operation. In some embodiments, the point cloud formation process is based on the use of two computationally efficient algorithms, the Fast Fourier Transform (FFT) and the Discrete Wavelet Transform (DWT). By performing the phase compensation map design as an offline process, a system or process has the potential to achieve low latency outputs due to the efficiency of its algorithmic core.

Because the phase compensation map was designed using mathematical procedures capable of generating closed form expressions, the reconstruction process has a deterministic behavior that allows process to evaluate its performance in the design stage. This stands in contrast to artificial intelligence (AI) or kernel related point cloud formation methods that require extensive validation to tune their performance parameters.

Figure 3:
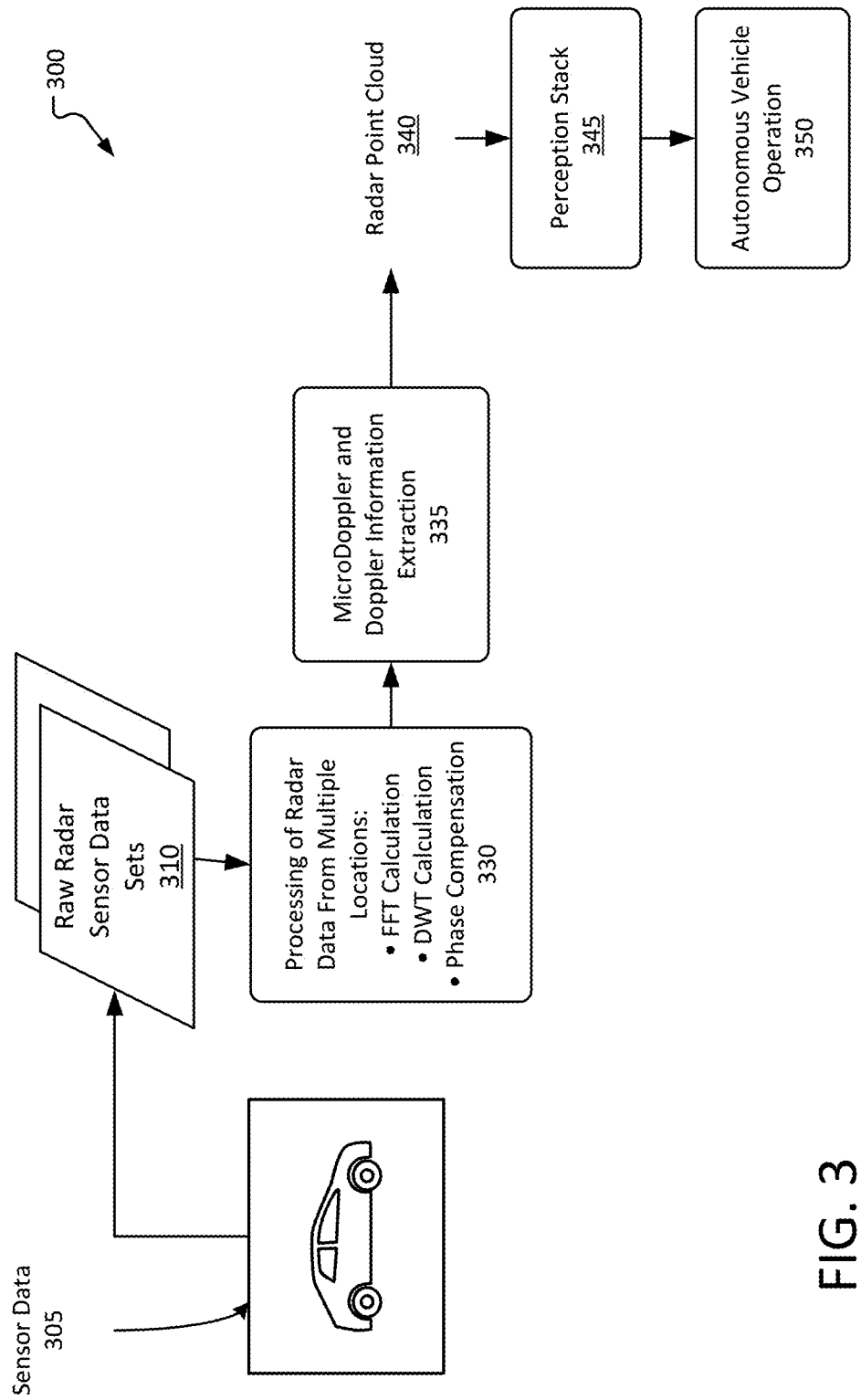
FIG. 3 is an illustration of multi-sensor radar microDoppler holography, according to some embodiments.

FIG. 3 is an illustration of multi-sensor radar microDoppler holography, according to some embodiments. In a system 300, such as an autonomous vehicle system, sensor data 305 is collected, where the sensor data includes Radar sensor data. In particular, multiple raw Radar sensor data sets 310 are generated for processing. In some embodiments, rather than being limited to processing of Radar data received at a signal location, the system 300 includes processing Radar data from multiple locations. As further illustrated in FIG. 4, in order to allow effective use of Radar data collected at multiple locations, the processing of Radar data 330 includes application of a Fast Fourier Transform (FFT) calculation and Discrete Wave Transform (DWT) calculation, and application of phase compensation to allow addition of the processed Radar data. The system further provides for micro-Doppler and Doppler information extraction from the processed Radar data 335 for use in forming a Radar point cloud 340.

The generated Radar point cloud 340 may then be provided to a perception stack 345 in the system 300, which may then provide perception information for use in autonomous vehicle operation 350. The perception stack 345, described at a high level, involves the use of sensor data, such as sensor data 305, to perceive what is present and what is occurring around an autonomous vehicle, such as autonomous vehicle 102 illustrated in FIGS. 1A and 1B. The perception stack 345 is used to enable the autonomous vehicle to detect the surrounding environment using information including data from the sensor systems and other components of the autonomous vehicle. More specifically, the perception stack 345 may be utilized to detect and classify objects, and determine locations, velocities, directions, and other information regarding such objects, which then may be utilized in the operation of the autonomous vehicle.

Figure 4:
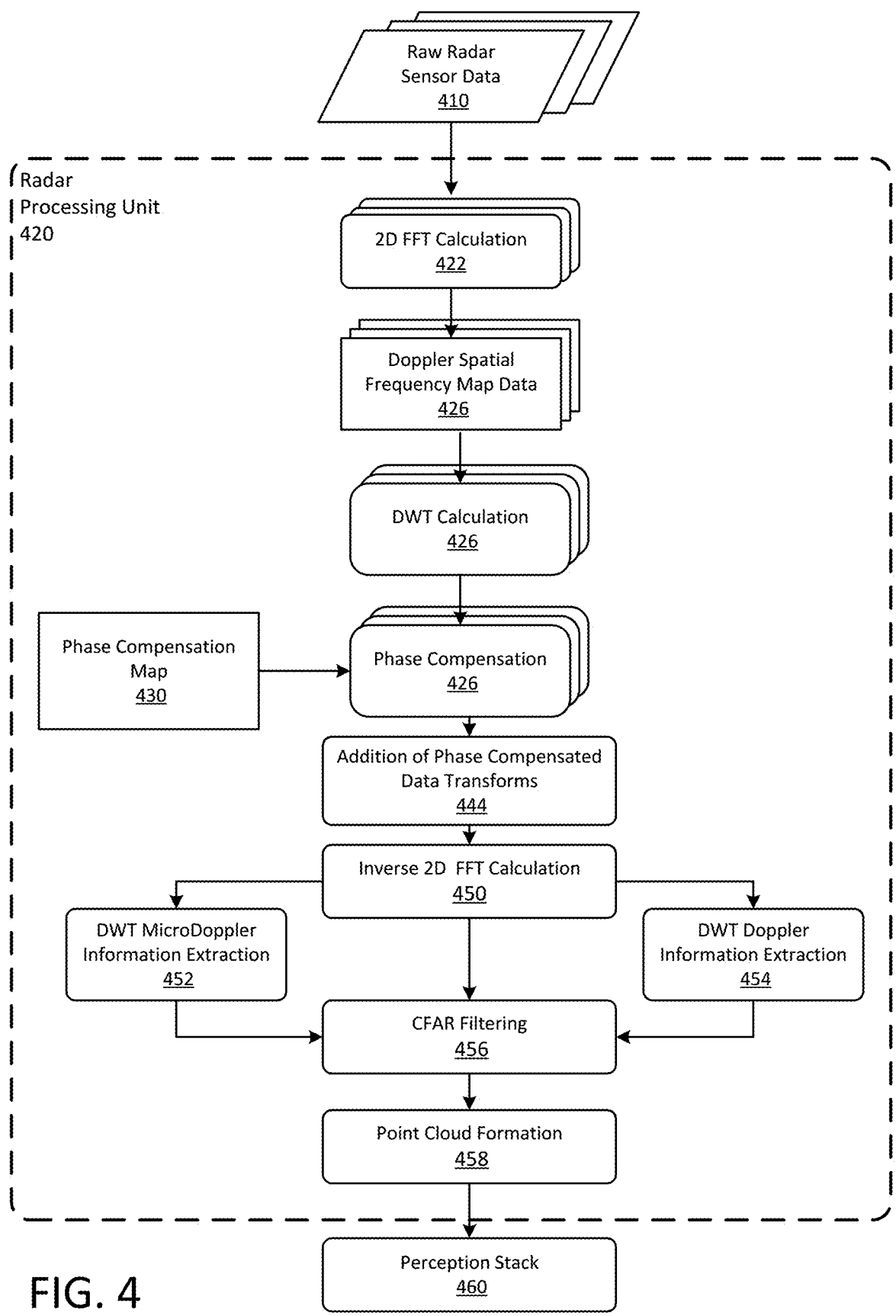
FIG. 4 illustrates multi-sensor Radar data processing, according to some embodiments.

FIG. 4 illustrates multi-sensor Radar data processing, according to some embodiments. As illustrated in FIG. 4, raw Radar sensor data 410 from multiple sensors at different locations, such as data received from sensors 104 of an autonomous vehicle 102, may be received by a processing unit 420, the processing unit 420 including a processing chain to provide processing and addition of the Radar and data. In the processing unit 420, a 2D (two-dimensional) Fourier transform 422 of the raw Radar sensor data 410 is calculated to generate Doppler spatial frequency maps 426.

In some embodiments, the processing unit 420 calculates a Discrete Wavelet Transform (DWT) in the Doppler direction (i.e., in the direction of the vector 250 as illustrated in FIG. 2) to generate sensor data transforms. Further, based on a location of each Radar sensor, a phase compensation is applied to each sensor data transform. The phase compensation may be based upon a phase compensation map 430, which may be generated prior to the operation of the Radar processing unit 420. The resulting phase compensated data transforms are then added together 444. An inverse 2D FFT 450 of the sum of the compensated data transforms is calculated in the Range-Azimuth direction to generate a transform result. As illustrated, the processing includes DWT microDoppler information extraction 452 to extract microDoppler information and DWT Doppler information extraction 454 to extract Doppler information. In the processing, low wavelet scales main components are identified and extracted using adaptive thresholding, with this value being reported as the main radial velocity component. Further, high wavelet scales main components are extracted from the discarded information in the adaptive thresholding, and this information is reported as the vibrational and rotational motion vectors.

The results of inverse 2D FFT calculation 450, DWT microDoppler information extraction 452, and DWT Doppler information extraction 454 are provided to CFAR (Constant False Alarm Rate) filtering 456 to eliminate clutter responses. CFAR in general refers to an adaptive algorithm for detecting target signal reflections in the presence of background noise, clutter, and interference. The resulting Radar point cloud is then formed 458.

The resulting Radar point cloud may then be reported to the perception stack 460 for perception processing, and use in, for example, autonomous vehicle operation.

Figure 5:
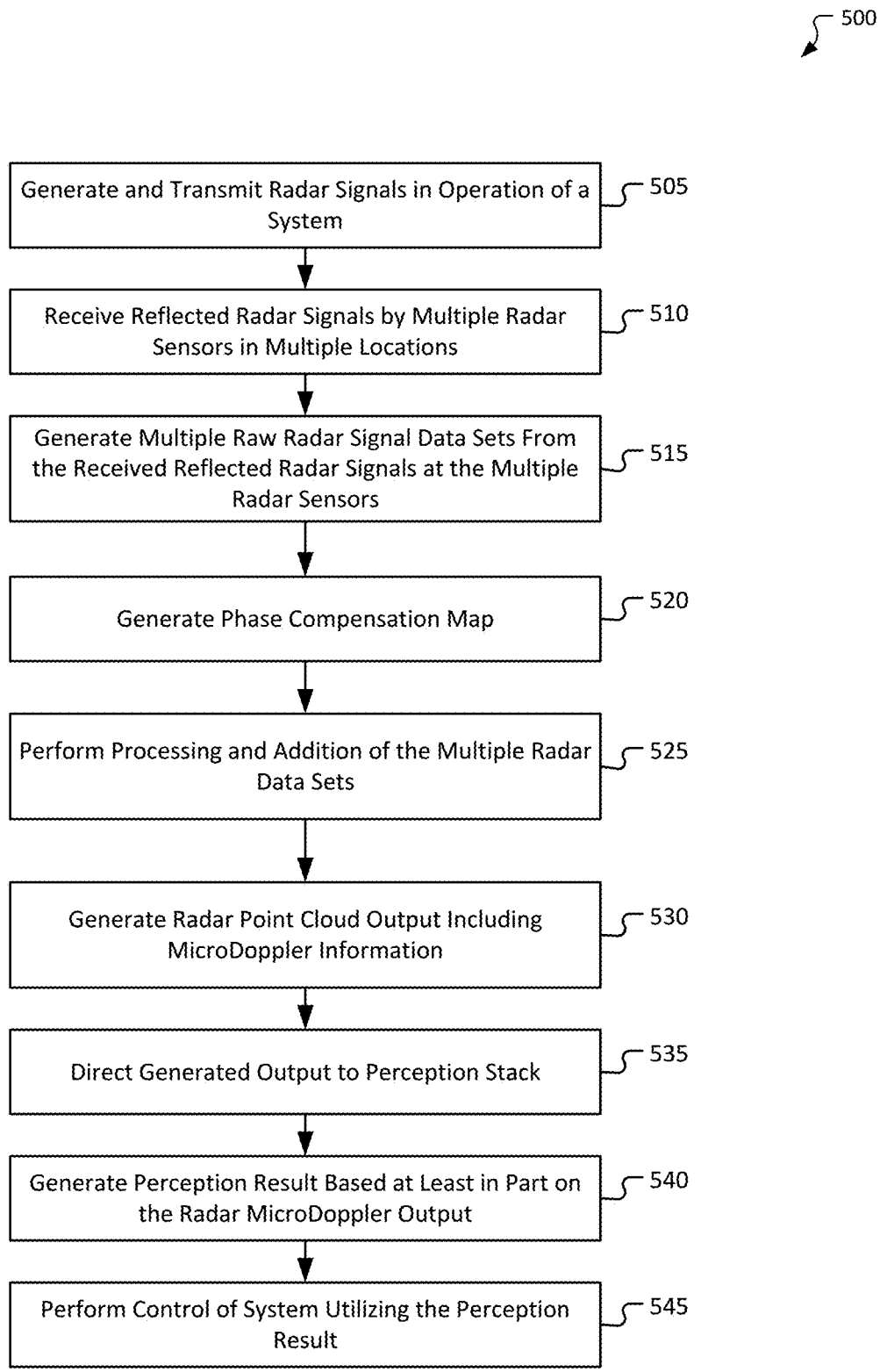
FIG. 5 is a flowchart to illustrate a process for multi-sensor radar microDoppler holography, according to some embodiments.

FIG. 5 is a flowchart to illustrate a process for multi-sensor radar microDoppler holography, according to some embodiments. In some embodiments, a process 500 includes generation and transmission of Radar signals in operation of a system 505, wherein the system may include an autonomous vehicle system. Reflected Radar signals are then respectively by multiple Radar sensors located in multiple locations 510, wherein the reflected Radar signals may be signals reflected by one or more objects in the vicinity of the system. Multiple Raw Radar signal data sets are generated from the received reflected signals at the multiple Radar sensors 515. The one or more objects may include a velocity relative to the system, thus generating a Doppler effect, and may have vibration or rotation qualities, thus generating a micro-Doppler effect. Doppler effect and micro-Doppler effect qualities thus may be contained in the reflected Radar data.

In some embodiments, the process 500 further includes generating a phase compensation map 520, and performing processing and addition of the multiple Radar data 525. The processing, as further illustrated in FIG. 6, may include application of a Fast Fourier Transform (FFT) calculation and Discrete Wave Transform (DWT) calculation, and application of phase compensation (utilizing the phase compensation map) to allow addition of the processed Radar data. The system further provides for micro-Doppler and Doppler information extraction from the processed Radar data for use in populating a Radar point cloud output including micro-Doppler information 530.

The generated output is directed to a perception stack of the system 535, and the perception stack generates a perception result based at least in part on the Radar micro-Doppler output 540. The process 500 may further provide for performing a control operation for the system, such as a control operation for an autonomous vehicle system, utilizing the perception result 545.

Figure 6:
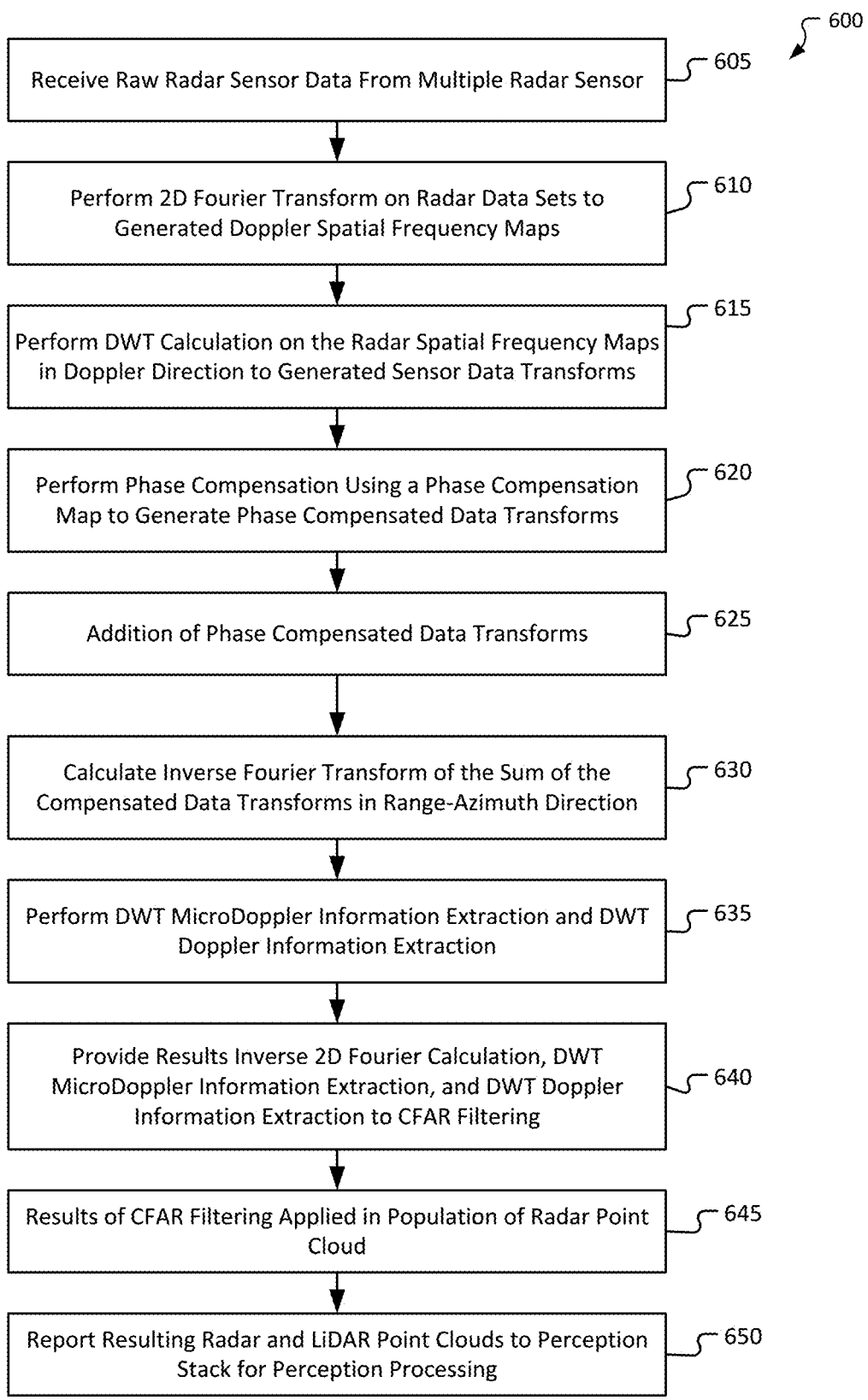
FIG. 6 is a flowchart to illustrate a process for multiple Radar sensor data processing, according to some embodiments.

FIG. 6 is a flowchart to illustrate a process for multiple Radar sensor data processing, according to some embodiments. In some embodiments, a process 600 includes receiving raw Radar sensor data from multiple Radar sensors at multiple locations 605, such as data received from sensors 104 of an autonomous vehicle 102 as illustrated in FIGS. 1A and 1B. A 2D Fourier transform is performed on the raw Radar sensor data sets to generate Doppler spatial frequency maps 610.

The process 600 further includes performing a DWT calculations on the Radar spatial frequency maps in the Doppler direction to generate sensor data transforms 615. Phase compensation is performed using a phase compensation map (such as the phase compensation map generated in block 520 of FIG. 5) to generate phase compensated data transforms 620. The phase compensated data transforms are then added together to generate a sum 625. An inverse 2D Fourier transform of the sum of the compensated data transforms is calculated in the Range-Azimuth direction 630.

The process 600 further includes performing a DWT processing includes performing DWT microDoppler information extraction and DWT Doppler information extraction 635. The results of inverse 2D Fourier calculation, DWT microDoppler information extraction, and DWT Doppler information extraction are provided to CFAR (Constant False Alarm Rate) filtering 640. The results of the CFAR filtering are then applied in population of the Radar point cloud 645.

The resulting Radar point cloud is reported to the perception stack for perception processing 650.

Figure 7:
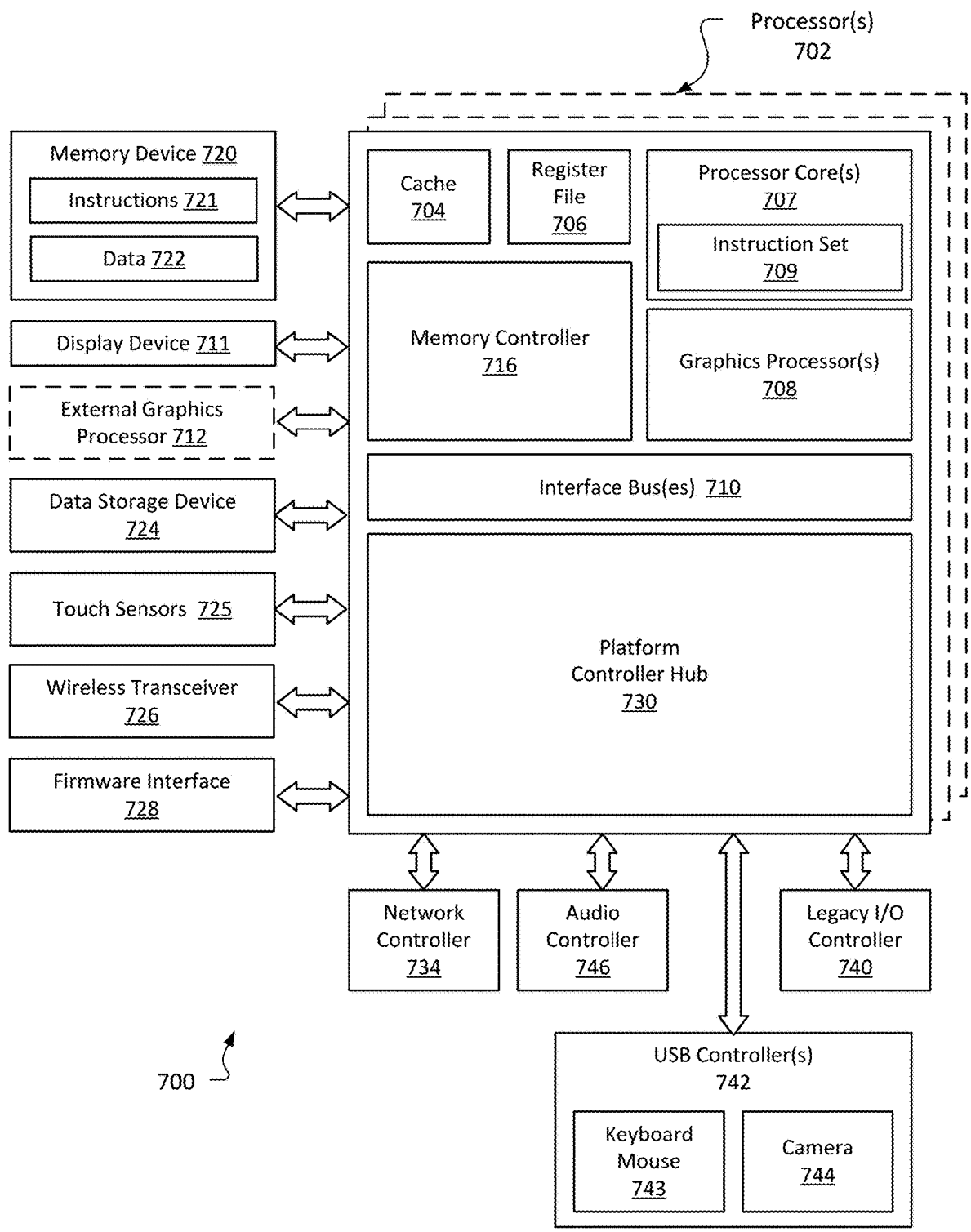
FIG. 7 illustrates an embodiment of an exemplary computing architecture for multi-sensor radar microDoppler holography, according to some embodiments.

FIG. 7 illustrates an embodiment of an exemplary computing architecture for multi-sensor radar microDoppler holography, according to some embodiments. In various embodiments as described above, a computing architecture 700 may comprise or be implemented as part of an electronic device. In some embodiments, the computing architecture 700 may be representative, for example, of a computer system that implements one or more components of the operating environments described above. The computing architecture 700 may be utilized to provide multi-sensor radar microDoppler holography, such as described in FIGS. 1A-6.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive or solid-state drive (SSD), multiple storage drives (of optical and/or magnetic storage medium), an object, an executable, a thread of execution, a program, and/or a computer. A storage medium may include a non-transitory storage medium. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In one embodiment, the system 700 is a processing platform incorporated within a system-on-a-chip (SoC or SOC) integrated circuit for use in mobile, handheld, or embedded devices.

An embodiment of system 700 can include, or be incorporated within, a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory 704 is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, non-volatile memory device such as flash memory device or phase-change memory device, or some other memory device having suitable performance to serve as process memory. Memory device 720 may further include non-volatile memory elements for storage of firmware. In one embodiment the memory device 720 can operate as system memory for the system 700, to store data 722 and instructions 721 for use when the one or more processors 702 execute an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device, or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, Long Term Evolution (LTE), or 5G transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high-definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. An apparatus comprising:
   a plurality of Radar sensors, including at least a first Radar sensor at a first location and a second Radar sensor at a second location, the first Radar sensor and the second Radar sensor having overlapping fields of view; and
   a processing chain for processing of sensor data, the processing chain to:
   perform a two-dimensional (2D) Fourier transform calculation for a plurality of sets of raw Radar sensor data to generate Doppler spatial frequency map data, the plurality of sets of raw Radar sensor data including at least a first set of raw sensor data associated with the first Radar sensor at the first location and a second set of raw sensor data associated with the second Radar sensor at the second, different location;
   perform a Discrete Wavelet Transform (DWT) calculation of the Doppler spatial frequency map data to generate sensor data transforms;
   apply phase compensation to generate phase compensated data transforms;
   add the phase compensated data transforms to generate a sum of the phase compensated data transforms;
   perform an inverse 2D Fourier transform calculation in a Range-Azimuth direction to generate a transform result; and
   extract microDoppler information and Doppler information extraction from the transform result.

2. The apparatus of claim 1, wherein applying phase compensation includes applying phase compensation based on a generated phase compensation map.

3. The apparatus of claim 1, wherein the processing chain is further to:
   perform CFAR (Constant False Alarm Rate) filtering of the transform result and the extracted microDoppler information and Doppler information.

4. The apparatus of claim 1, wherein the processing chain is further to:
   generate a Radar point cloud utilizing the transform result and the extracted microDoppler information and Doppler information.

5. The apparatus of claim 4, further comprising a perception stack, wherein the processing chain is further to provide the Radar point cloud to the perception stack to generate a perception result.

6. The apparatus of claim 5, wherein the processing chain is further to:
   perform a control operation for the apparatus based on the perception result.

7. The apparatus of claim 6, wherein the apparatus is at least a portion of an autonomous vehicle.

* * * * *